United States Patent
Tokunaga et al.

(10) Patent No.: US 11,053,160 B2
(45) Date of Patent: Jul. 6, 2021

(54) ALKALI-FREE GLASS

(71) Applicant: AGC Inc., Chiyoda-ku (JP)

(72) Inventors: Hirofumi Tokunaga, Chiyoda-ku (JP); Kazutaka Ono, Chiyoda-ku (JP); Motoyuki Hirose, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 219 days.

(21) Appl. No.: 16/282,363

(22) Filed: Feb. 22, 2019

(65) Prior Publication Data

US 2019/0185368 A1    Jun. 20, 2019

Related U.S. Application Data

(63) Continuation of application No. PCT/JP2017/029817, filed on Aug. 21, 2017.

(30) Foreign Application Priority Data

Aug. 23, 2016   (JP) .............................. JP2016-162676

(51) Int. Cl.
*C03C 3/087* (2006.01)
*C03C 3/091* (2006.01)
*C03C 3/093* (2006.01)

(52) U.S. Cl.
CPC .............. *C03C 3/093* (2013.01); *C03C 3/087* (2013.01); *C03C 3/091* (2013.01)

(58) Field of Classification Search
CPC ......... C03C 3/085; C03C 3/087; C03C 3/091; C03C 3/093
See application file for complete search history.

(56) References Cited

U.S. PATENT DOCUMENTS

| | | | |
|---|---|---|---|
| 2013/0210962 A1 | 8/2013 | Hofmann et al. | |
| 2013/0274086 A1 | 10/2013 | Tsujimura et al. | |
| 2013/0324389 A1* | 12/2013 | Nagashima | C03C 3/087 501/66 |
| 2014/0005027 A1 | 1/2014 | Brix | |
| 2014/0249017 A1* | 9/2014 | Allan | C03C 3/087 501/66 |
| 2016/0002095 A1 | 1/2016 | Tsujimura et al. | |

FOREIGN PATENT DOCUMENTS

| | | |
|---|---|---|
| JP | 61-236631 | 10/1986 |
| JP | 2006-36625 | 2/2006 |
| JP | 2006-36626 | 2/2006 |
| JP | 2014-500848 | 1/2014 |
| TW | 201609591 A | 3/2016 |
| WO | WO 2012/077609 A1 | 6/2012 |

OTHER PUBLICATIONS

International Search Report dated Nov. 7, 2017 in PCT/JP2017/029817 filed Aug. 21, 2017 (with English Translation).

* cited by examiner

*Primary Examiner* — Elizabeth A. Bolden (74) *Attorney, Agent, or Firm* — Oblon, McClelland, Maier & Neustadt, L.L.P.

(57) ABSTRACT

To provide an alkali-free glass, of which the compaction is low, the strain point is high, and the ultraviolet transmittance is high, and which is easy to melt.

An alkali-free glass, which comprises, as represented by mol % based on oxides,

| | |
|---|---|
| $SiO_2$ | from 65 to 75, |
| $Al_2O_3$ | from 9 to 15, |
| $B_2O_3$ | from 0 to 3, |
| MgO | from 0 to 12, |
| CaO | from 0 to 8, |
| SrO | from 0 to 6, and |
| BaO | from 0 to 5, | wherein MgO+CaO+SrO+BaO is from 12 to 22, and $4.84[Fe_2O_3]+5.65[Na_2O]+4.03[K_2O]+4.55[SnO_2]$ is at most 0.55, and of which the compaction is at most 80 ppm.

14 Claims, 1 Drawing Sheet

ALKALI-FREE GLASS

TECHNICAL FIELD

The present invention relates to an alkali-free glass suitable as a substrate glass for various displays.

BACKGROUND ART

Heretofore, if a substrate glass for various displays, in particular a glass designed to have a thin film of a metal or oxide formed on its surface, contains an alkali metal oxide, alkali metal ions are likely to diffuse into the thin film, thereby deteriorating the film properties. So, an alkali-free glass containing substantially no alkali metal ions are required.

Further, in the step of forming a thin film, the heat shrinkage (compaction) of a glass substrate by heating is required to be small.

At the time of producing a flat panel display (FPD) represented by a liquid crystal display device (LCD), two sheets of substrate glass to constitute FPD (in the case of LCD, a substrate glass provided with a TFT element and a substrate glass provided with a color filter) are bonded by a curable resin.

At that time, since FPD has a constituent element such as a TFT element which has a problem in terms of heat resistance, a photo-curable resin is usually used as a curable resin, and the resin is cured by ultraviolet irradiation. Therefore, a substrate glass for displays is required to have ultraviolet permeability. Patent Documents 1 and 2 propose an alkali-free glass substrate having an ultraviolet transmittance at the wavelength of 300 nm in the thickness of 0.5 mm being from 50 to 85%.

Generally, a mass-produced glass contains $Fe_2O_3$ derived from the raw material and the producing process. $Fe_2O_3$ is present in a glass as $Fe^{2+}$ or $Fe^{3+}$. Particularly, $Fe^{3+}$ has an absorption peak around the wavelength of 300 nm, and so it is necessary to reduce the content of $Fe_2O_3$ in order to improve the ultraviolet transmittance of the glass. However, in a case where the content of $Fe_2O_3$ is small, there is a problem that, in a melting step, the infrared absorption by $Fe^{2+}$ decreases, the glass temperature becomes hard to increase, the meltability deteriorates, and the foam quality decreases.

PRIOR ART DOCUMENTS

Patent Documents

Patent Document 1: JP-A-2006-36625
Patent Document 2: JP-A-2006-36626

DISCLOSURE OF INVENTION

Technical Problem

It is an object of the present invention to provide an alkali-free glass, of which the compaction that represents heat shrinkage in a process of producing a TFT element is low, the strain point is high, and the ultraviolet transmittance is high, and which is easy to melt.

Solution to Problem

The present invention provides an alkali-free glass, which comprises, as represented by mol % based on oxides,

| | |
|---|---|
| $SiO_2$ | from 65 to 75, |
| $Al_2O_3$ | from 9 to 15, |
| $B_2O_3$ | from 0 to 3, |
| MgO | from 0 to 12, |
| CaO | from 0 to 8, |
| SrO | from 0 to 6, and |
| BaO | from 0 to 5, | wherein MgO+CaO+SrO+BaO is from 12 to 22, and $4.84[Fe_2O_3]+5.65[Na_2O]+4.03[K_2O]+4.55[SnO_2]$ is at most 0.55, and of which the compaction is at most 80 ppm.

In particular, the present invention provides an alkali-free glass, which comprises, as represented by mol % based on oxides,

| | |
|---|---|
| $SiO_2$ | from 65 to 70, |
| $Al_2O_3$ | from 9 to 15, |
| $B_2O_3$ | from 0 to 3, |
| MgO | from 5 to 12, |
| CaO | from 3 to 8, |
| SrO | from 1 to 6, |
| BaO | from 0 to 4, |
| $Fe_2O_3$ | from 0.001 to 0.03, |
| $Na_2O$ | from 0.003 to 0.06, |
| $K_2O$ | from 0 to 0.02, |
| $SnO_2$ | from 0 to 0.12, and |
| $ZrO_2$ | from 0 to 2, | wherein MgO+CaO+SrO+BaO is from 15 to 22, MgO/(MgO+CaO+SrO+BaO) is at least 0.33, MgO/(MgO+CaO) is at least 0.40, MgO/(MgO+SrO) is at least 0.45, and $4.84[Fe_2O_3]+5.65[Na_2O]+4.03[K_2O]+4.55[SnO_2]$ is at most 0.55, and
preferably the strain point is at least 690° C., the average thermal expansion coefficient at from 50 to 350° C. is from $30 \times 10^{-7}$ to $45 \times 10^{-7}$/° C., the temperature $T_2$ at which the glass viscosity becomes $10^2$ dPa·s is at most 1,710° C., and the temperature $T_4$ at which the glass viscosity becomes $10^4$ dPa·s is at most 1,350° C.

Advantageous Effects of Invention

According to the present invention, an alkali-free glass can be obtained, of which the compaction is low, the strain point is high, and the ultraviolet transmittance is high, and which is easy to melt.

DESCRIPTION OF EMBODIMENTS

Now, the alkali-free glass of the present invention will be described.

(Composition Range of Each Component of Alkali-Free Glass)

If the content of $SiO_2$ is less than 65% (mol %, hereinafter the same unless stated otherwise), the strain point does not sufficiently increase, the average thermal expansion coefficient increases, and the density increases. The content is preferably at least 65.5%, more preferably at least 66%, particularly preferably at least 66.5%. If the content exceeds 75%, the meltability at the time of the production of the glass decreases, the temperature $T_2$ at which the glass viscosity becomes $10^2$ dPa·s and the temperature $T_4$ at which the glass viscosity becomes $10^4$ dPa·s increase, and the devitrification temperature increases. The content is preferably at most 70%, more preferably at most 69%, further preferably at most 68.5%, particularly preferably at most 68%.

$Al_2O_3$ suppresses the phase-separation of the glass, decreases the thermal expansion coefficient, and increases the strain point. However, if the content is less than 9%, these effects are unlikely to be obtained. In addition, if the content is less than 9%, it raises components which increase the average thermal expansion coefficient, and as a result, the average thermal expansion coefficient increases. The content is preferably at least 10%, more preferably at least 11%, particularly preferably at least 12%, further preferably at least 12.5%. If the content exceeds 15%, the meltability of the glass at the time of production may deteriorate, and the devitrification temperature may increase. The content is preferably at most 14.5%, more preferably at most 14%, further preferably at most 13.5%.

$B_2O_3$ improves the meltability of the glass and decreases the devitrification temperature, and so it may be added to the content of up to 3%. However, if the content is too large, the strain point becomes low. Therefore, the content is preferably at most 2.5%, more preferably at most 2%, particularly preferably at most 1.5%. Considering the environmental burden, it is preferable that the glass contains substantially no $B_2O_3$. The term "containing substantially no" means not containing the substance other than unavoidable impurities (this also applies to the following description).

MgO has the characteristic of not increasing the thermal expansion coefficient among alkaline earth elements and increasing the Young's modulus while keeping the density low. MgO can be contained to improve the meltability at the time of the preparation of the glass. If the content exceeds 12%, the devitrification temperature may rise. The content is preferably at most 11%, more preferably at most 10%, particularly preferably at most 9.5%. In order to obtain a low expansion ratio, a low density and a high Young's modulus and to increase the meltability of the glass, the content of MgO is preferably at least 3%, more preferably at least 5%, more preferably at least 6%, further preferably at least 7%, further preferably at least 8%, particularly preferably at least 8.5%.

CaO has the characteristic of not increasing the thermal expansion coefficient of the glass after MgO among alkaline earth metals, and increasing the Young's modulus while keeping the density low. CaO may be contained in order to improve the meltability at the time of the preparation of the glass. If the content is too large, the devitrification temperature may rise. So, the content is at most 8%, preferably at most 7%, more preferably at most 6.5%, further preferably at most 6%. Further, in order to increase the meltability of the glass, the content is preferably at least 3%, more preferably at least 4%, more preferably at least 4.5%, further preferably at least 5%.

SrO is not an essential component. However, in order to improve the meltability without raising the devitrification temperature of the glass, the content of SrO is preferably at least 1%, more preferably at least 2%, more preferably at least 3%, further preferably at least 3.5%. On the other hand, if the content exceeds 6%, the expansion coefficient tends to increase. At most 5.5% or at most 5% is preferred.

BaO is not an essential component but may be contained for improving the meltability. However, if BaO is excessively contained, the thermal expansion coefficient and density of the glass excessively increase, and so the content is at most 5%. The content is preferably at most 4%, more preferably less than 2%, more preferably at most 1% or at most 0.5%. More preferably, the alkali-free glass substantially contains no BaO.

$SnO_2$ is not an essential component but is preferably contained for improving the ultraviolet transmittance of the glass. In a glass melt, $SnO_2$ is reduced to SnO at a temperature of at least 1,450° C. In a step of cooling the glass, SnO is oxidized and $Fe_2O_3$ is reduced in the glass, whereby the ultraviolet transmittance of the glass increases.

The Sn content in the glass is preferably at least 0.01% based on $SnO_2$. If the content is at least 0.01%, the effect of improving the ultraviolet transmittance of the glass is preferably provided. The content is preferably at most 0.02%, more preferably less than 0.03%. If the content exceeds 0.12%, the coloring of the glass or the devitrification may occur, and so the content of Sn based on $SnO_2$ is at most 0.12%. The content is preferably at most 0.10%, more preferably at most 0.07%, further more preferably at most 0.05%. More preferably, the alkali-free glass substantially contains no Sn.

The Sn content is not the amount of Sn added to the glass raw material but the amount of Sn present in the glass after cooling.

$ZrO_2$ may be added up to 2% to lower the glass melting temperature. If the content exceeds 2%, the glass becomes unstable or the dielectric constant ε of the glass becomes large, so it is preferably at most 1.5%. More preferably, the alkali-free glass substantially contains no $ZrO_2$.

If the total content of MgO, CaO, SrO and BaO is less than 13%, the meltability is poor. The total content is preferably at least 15%, more preferably at least 17%, still more preferably at least 18%. If the total content exceeds 22%, there may arise a problem that the thermal expansion coefficient cannot be reduced. The content is preferably at most 21%, more preferably at most 20%, further preferably at most 19.5%.

If the total amount of MgO, CaO, SrO and BaO satisfies the following ratios, it will preferably raise the strain point without increasing the devitrification temperature, and lower the viscosity of the glass, especially the temperature $T_4$ at which the glass viscosity becomes $10^4$ dPa·s.

MgO/(MgO+CaO+SrO+BaO) is at least 0.33, preferably at least 0.36, more preferably at least 0.40, particularly preferably at least 0.45.

MgO/(MgO+CaO) is at least 0.40, preferably at least 0.50, more preferably at least 0.55.

MgO/(MgO+SrO) is at least 0.45, preferably at least 0.55, more preferably at least 0.60.

It is more preferable to satisfy all three ratios.

In the alkali-free glass of the present invention, in order to increase the meltability and make it easy to obtain a high-quality glass, the contents of alkali metals in the glass raw material are preferably in the following range as represented by mol % based on oxides: $Na_2O$ is from 0.003 to 0.06%, and $K_2O$ is from 0 to 0.02%. The alkali-free glass has a lower content of alkali metal oxides and has less alkali metal ions present in the molten glass, as compared with an alkali glass such as a soda lime glass. Therefore, it has a high electric resistivity, and is suitable for electric heating. On the other hand, alkali metal oxides in the glass raw material act as a flux to improve the meltability. Therefore, if the content of the alkali metal oxides is too small, the defect quality of the glass to be produced is likely deteriorated.

The present invention particularly focused on the content of $Na_2O$. In the glass of the present invention, the content of $Na_2O$ is preferably from 0.005 to 0.04%, more preferably from 0.008 to 0.03%, further preferably from 0.01 to 0.025%. It is Na$_2$O that occupies the majority of alkali metal oxides inevitably contained in the raw material.

The content of K$_2$O is preferably from 0.001 to 0.02%, more preferably from 0.003 to 0.015%, further preferably from 0.005 to 0.01%.

If the content of alkali metal oxides in the glass raw material is increased, the alkali metal ions diffuse into the thin film to deteriorate the film characteristics, which is a problem when used as a substrate glass for various displays. However, if the total content of alkali metal oxides (Li$_2$O+Na$_2$O+K$_2$O) in the glass composition is at most 0.06%, preferably at most 0.04%, more preferably at most 0.03%, further preferably at most 0.02%, such a problem will not occur.

The content of Fe$_2$O$_3$ is at most 0.03% in order to increase the ultraviolet transmittance, and it is preferably at least 0.001% in order to increase the heating efficiency by burner combustion. The content is more preferably at least 0.003% and at most 0.025%, more preferably at least 0.005% and at most 0.02%, further preferably at least 0.008% and at most 0.015%.

In the alkali-free glass of the present invention, the value represented by the following formula (I) is at most 0.55.

$$4.84[Fe_2O_3]+5.65[Na_2O]+4.03[K_2O]+4.55[SnO_2] \quad (I)$$

In the formula (I), the value of a component surrounded by square brackets represents the content (mol %) of each component in the alkali free glass (the same applies to the description of the other parts of the specification).

The value represented by the formula (I) (also referred to as the parameter of the formula (I)) is an index of the electrical resistivity of the alkali-free glass at 1,400° C. If the value is at most 0.55, the electric resistivity at the time of electrical heating becomes high, and Joule heat can be easily obtained. In the alkali-free glass of the present invention, the value represented by the formula (I) is more preferably at most 0.40, further preferably at most 0.30, particularly preferably at most 0.20.

The lower limit of the value represented by the formula (I) is not particularly limited, but the value represented by the formula (I) is usually at least 0.04, particularly at least 0.08.

The glass preferably does not substantially contain P$_2$O$_5$ in order not to cause the characteristic degradation of the thin film of a metal or oxide provided on the glass surface at the time of the preparation of a panel. Further, in order to facilitate recycling of the glass, it is preferable that the glass does not substantially contain PbO, As$_2$O$_3$ and Sb$_2$O$_3$.

In addition, in order to improve the meltability, clarity and moldability of the glass, ZnO, SO$_3$, F, and Cl may be added in a total amount of at most 5% to the glass raw material.

In the alkali-free glass of the present invention, it is preferable to use the following as a raw material for each component in order to enhance the meltability.

(Silicon Source)

As the silicon source of SiO$_2$, it is possible to use silica sand. It is preferred to use silica sand which has a median particle diameter D$_{50}$ of from 20 μm to 27 μm, of which the proportion of particles having a particle diameter of at most 2 μm is at most 0.3 vol %, and of which the proportion of particles having a particle diameter of at least 100 μm is at most 2.5 vol %, since it is possible to readily melt the silica sand while suppressing agglomeration of the silica sand, whereby it makes it easy to melt the silica sand and it makes it possible to obtain an alkali-free glass having little bubbles and having high homogeneity and flatness.

In this specification, "particle diameter" is a diameter corresponding to a sphere of silica sand (which is meant for the primary particle diameter in the present invention).

Specifically, it is a particle diameter in the particle size distribution of a powder measured by a laser diffraction/scattering method.

In this specification, the "median particle diameter D$_{50}$" is a particle diameter such that in the particle size distribution of a powder measured by a laser diffraction method, the volumetric frequency of particles larger than a certain particle diameter occupies 50% of the volumetric frequency of the entire powder. In other words, it is a particle diameter such that in the particle size distribution of a powder measured by a laser diffraction method, the cumulative frequency is 50%.

Further, in this specification, the "proportion of particles having a particle diameter of at most 2 μm" and "proportion of particles having a particle diameter of at least 100 μm" are determined, for example, by measuring the particle size distribution by a laser diffraction/scattering method.

It is more preferred that the median particle size D$_{50}$ of silica sand is at most 25 μm, since the silica sand becomes readily soluble. In addition, it is particularly preferable that the proportion of particles having a particle diameter of at least 100 μm in a silica sand is 0%, since it makes it easier to dissolute the silica sand.

(Alkaline Earth Metal Source)

As the alkaline earth metal source, an alkaline earth metal compound may be used. Specific examples of the alkaline earth metal compound include, for example, carbonates such as MgCO$_3$, CaCO$_3$, BaCO$_3$, SrCO$_3$, (Mg,Ca)CO$_3$ (dolomite), etc., oxides such as MgO, CaO, BaO, SrO, etc., and hydroxides such as Mg(OH)$_2$, Ca(OH)$_2$, Ba(OH)$_2$, Sr(OH)$_2$, etc.

It is preferable to contain hydroxides of alkaline earth metals in part or all of the alkaline earth metal source, since they decrease the amount of undissolved SiO$_2$ component at the time of the dissolution of the glass raw material. If the amount of undissolved SiO$_2$ component contained in the silica sand increases, this undissolved SiO$_2$ is taken into bubbles which are generated in the molten glass and moves near the surface layer of the molten glass. This causes a difference in the composition ratio of SiO$_2$ between the surface layer of the molten glass and the portion other than the surface layer, thereby lowering the homogeneity of the glass and also reducing the flatness.

The content of hydroxides of alkaline earth metals is preferably from 15 to 100 mol %, more preferably from 30 to 100 mol %, even more preferably from 60 to 100 mol %, based on 100 mol % of the alkaline earth metal source, since they lower the amount of undissolved SiO$_2$ component at the time of the dissolution of the glass raw material. Here, "mol %" in this specification is converted to MO, and M is an alkaline earth metal element.

As the molar ratio of hydroxides in the alkaline earth metal source increases, the amount of undissolved SiO$_2$ component at the time of the dissolution of the glass raw material decreases, and so it is better if the molar ratio of the hydroxides is higher.

As the alkaline earth metal source, specifically, a mixture of a hydroxide and a carbonate of an alkaline earth metal, a hydroxide alone of an alkaline earth metal, or the like can be used. As the carbonate, it is preferable to use at least one of MgCO$_3$, CaCO$_3$ and dolomite. As the hydroxide of the alkaline earth metal, at least one of Mg(OH)$_2$ or Ca(OH)$_2$ is preferably used, and Mg(OH)$_2$ is particularly preferably used.

It is preferable that the glass raw material does not substantially contain $P_2O_5$ so as not to cause the property deterioration of the thin film of a metal or oxide provided on the glass surface at the time of the preparation of the panel. A Ca raw material often contains phosphorus as impurity. Thus, in a case where the glass contains CaO, it is preferable to use a raw material in high purity.

(Boron Source)

In the case where the alkali-free glass contains $B_2O_3$, a boron compound can be used as the boron source. Specific examples of the boron compound include orthoboric acid ($H_3BO_3$), metaboric acid ($HBO_2$), tetraboric acid ($H_2B_2O_4O_7$) and boric anhydride ($B_2O_3$). In the production of an usual alkali-free glass, orthoboric acid is used from the standpoints of inexpensiveness and easy availability.

As the boron source, a boron source containing boric anhydride in an amount of from 10 to 100 mass % ($B_2O_3$ conversion) based on 100 mass % ($B_2O_3$ conversion) of the boron source is preferably used. If boric anhydride is contained in an amount of at least 10 mass %, agglomeration of the glass raw material can be suppressed, and the effect of decreasing bubbles and improvement in homogeneity and flatness can be obtained. Boric anhydride is more preferably from 20 to 100 mass %, and still more preferably from 40 to 100 mass %. Orthoboric acid is preferred as a boron compound other than boric anhydride, from the standpoints of inexpensiveness and easy availability.

Next, one embodiment of the method for producing the alkali-free glass of the present invention will be described by exemplifying a float method.

The glass of the present invention can be prepared by a method in which the glass raw material mixed so as to have the above composition is continuously put into a melting furnace, and heated and melted at from 1,350 to 1,750° C. For the heating in the melting furnace, it is preferable to concurrently utilizes the heating by combustion flame of a burner and the electrical heating of the molten glass in the melting furnace.

The burner is usually arranged upper the melting furnace, and the heating is conducted by combustion flame of fossil fuels, specifically, combustion flame of liquid fuels such as heavy oil and kerosene, or gas fuels such as LPG. During the combustion of those fuels, the fuel can be mixed with an oxygen gas to burn, or the fuel can be mixed with an oxygen gas and air to burn. By using these methods, water can be contained in the molten glass and the β-OH value of the alkali-free glass produced can be controlled.

On the other hand, the electrical heating of the molten glass in the melting furnace is preferably conducted by applying direct current voltage or alternating current voltage to a heating electrode provided at the bottom or side of the melting furnace so as to be dipped in the molten glass in the melting furnace. In performing the electrical heating, it is preferred that the potential difference between electrodes is maintained at from 100 to 500 V, as described hereinafter. To apply such direct current voltage, alternating current utilizable as a commercial power source must be converted into direct current. Therefore, the application of alternating current voltage is preferred.

During the electrical heating of the molten glass, the application of alternating current voltage so as to satisfy the requirements described below is preferred from the standpoints of the suppression of electrolysis of the molten glass in the melting furnace and generation of bubbles thereby, and the efficiency during the electrical heating.

Local current density: from 0.1 to 2.0 A/cm²
Potential difference between electrodes: from 20 to 500 V
Frequency of alternating current voltage: from 10 to 90 Hz In particular, the local current density is more preferably from 0.2 to 1.7 A/cm², and still more preferably from 0.3 to 1.0 A/cm². The potential difference between electrodes is more preferably from 30 to 480 V, and still more preferably from 40 to 450 V. The frequency of alternating current voltage is more preferably from 30 to 80 Hz, and still more preferably from 50 to 60 Hz.

The material used in the heating electrode is required to have not only excellent conductivity but also excellent heat resistance and erosion resistance to the molten glass. Examples of the material satisfying those requirements include rhodium, iridium, osmium, hafnium, molybdenum, tungsten, platinum and alloys thereof.

It is preferred that in a case where the total of heating quantity by combustion flame of a burner and heating quantity by electrical heating of the molten glass in a melting furnace is represented by $T_0$ (J/h), the heating quantity T (J/h) by the electrical heating satisfies the following formula (II).

$$0.10 \times T_0 \leq T \leq 0.40 \times T_0 \qquad (11)$$

If T is smaller than $0.10 \times T_0$, there is a concern that the effect of concurrently using electrical heating of the molten glass, that is, the effect of suppressing erosion of the refractory constituting the melting furnace, becomes insufficient.

If T is larger than $0.40 \times T_0$, there is a concern that the temperature at the bottom of the melting furnace is increased and erosion of the refractory proceeds.

Because the melting furnace is heated to a high temperature of from 1,400 to 1,700° C. at the time of melting the glass raw material, a refractory is used as a constituent material thereof. The refractory constituting the melting furnace is required to have erosion resistance to the molten glass, mechanical strength and oxidation resistance, in addition to heat resistance.

A zirconia-based refractory containing at least 90 mass % of $ZrO_2$ has been preferably used as the refractory constituting the melting furnace, because it has excellent erosion resistance to the molten glass.

However, the above zirconia-based refractory contains alkali components (e.g., $Na_2O$ and $K_2O$) as components for reducing the viscosity of the matrix glass in the total amount of at least 0.12 mass %. Therefore, it shows ionic conductivity due to the presence of the alkali components when heated to a high temperature of from 1,400 to 1,700° C. For this reason, there is a concern that, during the electrical heating, an electric current flows from a heating electrode provided in the melting furnace not only to the molten glass, but also to the refractory constituting the melting furnace.

In a case where the electrical resistivity at 1,400° C. of the molten glass is represented by Rg (Ωcm) and the electrical resistivity at 1,400° C. of the refractory constituting the melting furnace is represented by Rb (Ωcm), the glass raw material and the refractory constituting the melting furnace are preferably selected so as to be Rb>Rg.

As shown in Examples described hereinafter, the electrical resistivity of the molten glass and the refractory decreases as the temperature increases, but the decrease of the electrical resistivity to the increase of the temperature is larger in the molten glass than in the refractory. Therefore, if the electrical resistivity at 1,400° C. has the relationship of Rb>Rg, the electrical resistivity of the refractory is always larger than that of the molten glass at the higher temperature, that is, in a temperature range of from 1,400 to 1,700° C.

If the glass raw material and the refractory constituting the melting furnace are selected so as to be Rb>Rg, the electric current flowing from the heating electrode to the refractory constituting the melting furnace will be suppressed during the electrical heating.

Therefore, the ratio (Rb/Rg) between Rb and Rg preferably satisfies Rb/Rg>1.00, more preferably Rb/Rg>1.05, further more preferably Rb/Rg>1.10.

In the case of the alkali-free glass, Rg can be decreased by adding an alkali metal oxide, $Fe_2O_3$ and, if necessary, $SnO_2$.

Rg can be controlled also by changing the temperature $T_2$ at which the viscosity η of the alkali-free glass produced becomes $10^2$ poises (dPa·s). Rg is decreased as $T_2$ is decreased.

In the case of a preferred composition of the refractory described hereinafter, Rb can be controlled by changing the content of alkali components (e.g., $Na_2O$ and $K_2O$). Rb can be controlled also by changing the proportion of $K_2O$ in the alkali components. Rb is increased as the content of alkali components (e.g., $Na_2O$ and $K_2O$) decreases. Rb is increased as the proportion of $K_2O$ in the alkali components increases.

An example of the refractory satisfying Rb>Rg, which is suitable for the production of the alkali-free glass of the present invention, may be a high zirconia fused cast refractory containing, in mass %, from 85 to 91% of $ZrO_2$, from 7.0 to 11.2% of $SiO_2$, from 0.85 to 3.0% of $Al_2O_3$, from 0.05 to 1.0% of $P_2O_5$, from 0.05 to 1.0% of $B_2O_3$, and from 0.01 to 0.12% in the total amount of $K_2O$ and $Na_2O$, in which the amount of $K_2O$ is larger than that of $Na_2O$.

The high zirconia fused cast refractory having the above composition is a refractory in which the major portion as from 85 to 91% of the chemical component is zirconia ($ZrO_2$). It comprises baddeleyite crystals as a main constituent component; shows excellent erosion resistance to the molten glass; has small content of alkali components; and mainly contains $K_2O$ having large ionic radius and small mobility as the alkali component. Therefore, its electrical resistivity at a temperature range of from 1,400 to 1,700° C. is large.

The refractory constituting the melting furnace is preferably a high zirconia fused cast refractory containing, in mass %, from 88 to 91% of $ZrO_2$, from 7.0 to 10% of $SiO_2$, from 1.0 to 3.0% of $Al_2O_3$, from 0.10 to 1.0% of $P_2O_5$, and from 0.10 to 1.0% of $B_2O_3$ as chemical components.

The alkali-free glass can be obtained by continuously putting the glass raw material into the melting furnace, heating it to a temperature of from 1,400 to 1,700° C. to form the molten glass, and then forming the molten glass into a sheet shape by a float method. More specifically, the alkali-free glass can be obtained as a sheet glass by forming into a sheet having a predetermined thickness by the float method, followed by slow cooling and cutting.

The method for forming a sheet glass is preferably a float method, a fusion method, a roll-out method or a slot down-draw method. Considering the productivity and the increasing size of a sheet glass, a float method is particularly preferred.

The glass substrate made of the alkali-free glass of the present invention (hereinafter also referred to as an alkali-free glass substrate of the present invention) preferably has an ultraviolet transmittance at a wavelength of 300 nm in a glass thickness of 0.5 mm being at least 40%.

In the production of FPD, the ultraviolet light which is used for an ultraviolet curing resin for bonding two sheets of substrate glass constituting FPD is mainly ultraviolet light having a wavelength of around 300 nm. If the two sheets of substrate glass have a low ultraviolet transmittance at a wavelength of 300 nm, it takes a long time to bond the two sheets of substrate glass by an ultraviolet curing resin. That is, even if the ultraviolet curable resin is irradiated with ultraviolet light, it is easily absorbed by the substrate glass, and so it takes time to cure the resin.

Since the alkali-free glass substrate of the present invention has a high ultraviolet transmittance at a wavelength of 300 nm, it will not take a long time to cure the ultraviolet curing resin when used as a substrate glass constituting FPD.

The ultraviolet transmittance of the glass substrate also varies depending on the thickness of the substrate. In the present invention, in order to eliminate the influence due to the thickness of the substrate, it was normalized to the ultraviolet transmittance in the glass thickness of 0.5 mm.

The ultraviolet transmittance at a wavelength of 300 nm is preferably at least 45%, further preferably at least 50%, further preferably at least 70%. However, if the ultraviolet transmittance becomes too high, the property of TFT elements may change (for example, a shift of a Vth property in an oxide semiconductor) when irradiated by ultraviolet light and the property of FPD constituent elements may be impaired.

If the alkali-free glass substrate has an ultraviolet transmittance at a wavelength of 300 nm in the plate thickness of 0.5 mm being at most 85%, there is no possibility that FPD constituent elements, which have a problem of heat resistance, are damaged at the time of ultraviolet irradiation. It is preferably at most 80%, more preferably at most 75%.

In the alkali-free glass of the present invention, the compaction measured as described below is preferably at most 80 ppm. The compaction is glass heat shrinkage caused by relaxation of a glass structure at the time of heat treatment. If the alkali-free glass of the present invention has a compaction falling within the above range, it can provide an advantage such that the dimensional stability in a process of preparing TFT, etc. is excellent.

[Method for Measuring Compaction]

A glass plate sample (a specimen with 100 mm length×10 mm width×1 mm thickness, polished with cerium oxide) is held at a temperature of the glass transition point plus 100° C. for 10 minutes and then cooled to a room temperature at a rate of 40° C. per minute. Here, the total length (length direction) L1 of the sample is measured. Next, the sample is heated to 600° C. at a rate of 100° C. per hour, held at 600° C. for 80 minutes, and cooled to room temperature at a rate of 100° C. per hour, and then the total length L2 of the sample is measured again. The compaction is defined as (L1−L2)/L1: the ratio of the difference (L1−L2) in the total length before and after the heat treatment at 600° C. to the total length L1 of the sample before heat treatment at 600° C.

In a case where it is difficult to measure the total length of the sample with high accuracy, the compaction can be obtained more accurately by forming indentations at two places on the sample surface and measuring the interval.

In this case, it is preferable that dotted indentations are applied to the surface of the sample at two positions in the length direction at an interval A (A=95 mm), heated to 600° C. at a rate of 100° C. per hour, held at 600° C. for 80 minutes, and cooled to a room temperature at a rate of 100° C. per hour, and then the interval B between the indentations is measured. The compaction can be obtained from (A−B)/A.

Among them, the alkali-free glass of the present invention can have a compaction which is more preferably at most 70 ppm, further preferably at most 60 ppm, particularly preferably at most 50 ppm. Therefore, the alkali-free glass of the present invention is also suitable for the production of a high definition TFT, and thus it has further advantages.

The alkali-free glass of the present invention has a strain point of at least 690° C., preferably more than 700° C., whereby it is possible to effectively suppress heat shrinkage at the time of the preparation of a panel.

The strain point is more preferably at least 710° C., most preferably at least 720° C. If the strain point is at least 720° C., it is suitable for a high strain point (for example, a display or illumination substrate for organic EL having a plate thickness of at most 0.7 mm, preferably at most 0.5 mm, more preferably at most 0.3 mm, or a display or illumination substrate for a thin plate having a thickness of at most 0.3 mm, preferably at most 0.1 mm). In molding a sheet glass having a plate thickness of at most 0.7 mm, further at most 0.5 mm, further at most 0.3 mm, further at most 0.1 mm, the drawing-out speed during molding tends to increase. If the drawing-out speed during molding increases, the glass tends to be quickly cooled and the fictive temperature of the glass rises and then the compaction of the glass tends to increase. Even in this case, if a high strain point glass is used, the compaction can be suppressed.

The alkali-free glass of the present invention has a glass transition point of preferably at least 750° C., more preferably at least 760° C., further more preferably at least 770° C., most preferably at least 780° C.

The alkali-free glass of the present invention has an average thermal expansion coefficient at from 50° C. to 350° C. being from $30\times10^{-7}$/° C. to $45\times10^{-7}$/° C., whereby the thermal shock resistance is large and it is possible to improve the productivity in preparing a panel. The average thermal expansion coefficient at from 50° C. to 350° C. is preferably from $35\times10^{-7}$/° C. to $40\times10^{-7}$/° C.

The alkali-free glass of the present invention has a density of preferably at most 2.65 g/cm$^3$, more preferably at most 2.64 g/cm$^3$, and further preferably at most 2.62 g/cm$^3$.

The alkali-free glass of the present invention has a temperature $T_2$ at which viscosity $\eta$ becomes $10^2$ poise (dPa·s) being preferably at most 1,710° C., more preferably at most 1,690° C., further preferably at most 1,670° C., and particularly preferably at most 1,660° C. Thus, melting is relatively easily performed.

Further, the alkali-free glass of the present invention has a temperature $T_4$ at which viscosity $\eta$ becomes $10^4$ poise being preferably at most 1,350° C., more preferably at most 1,330° C., further preferably at most 1,320° C., and particularly preferably at most 1,310° C. Such a temperature is preferable for a float process.

The devitrification temperature in this specification is an average value between the maximum temperature at which crystals are deposited on the surface and inside of the glass and the minimum temperature at which crystals are not deposited, which are determined by putting pulverized glass particles in a platinum plate, performing heat treatment for 17 hours in an electric furnace controlled to a constant temperature and performing optical microscopic observation after the heat treatment.

The alkali-free glass of the present invention has a Young's modulus of at least 82 GPa, preferably at least 83 GPa, more preferably at least 84 GPa, further preferably at least 84.5 GPa. The Young's modulus is preferably larger, but is usually preferably at most 95 GPa. The Young's modulus can be measured by an ultrasonic pulse method.

The alkali-free glass of the present invention has a photoelastic constant of preferably at most 31 nm/MPa/cm.

There may be a case where a glass substrate has birefringence due to stress generated during a liquid crystal display panel manufacturing process or at a time of using the liquid crystal display device, resulting in a phenomenon in which a black display turns to grey to decrease the contrast of the liquid crystal display.

If the photoelastic constant is set to be at most 31 nm/MPa/cm, it is possible to minimize the phenomenon. The photoelastic constant is preferably at most 30 nm/MPa/cm, more preferably at most 29 nm/MPa/cm, further preferably at most 28.5 nm/MPa/cm, particularly preferably at most 28 nm/MPa/cm.

The non-alkali glass of the present invention has, considering the easiness of securing other physical properties, a photoelastic constant of preferably at least 23 nm/MPa/cm, more preferably at least 25 nm/MPa/cm.

The photoelastic constant can be measured at the measurement wavelength of 546 nm by means of a disk compression method.

The alkali-free glass of the present invention has a relative dielectric constant of preferably at least 5.6.

In the case of an in-cell type touch panel (with a built-in touch sensor in a liquid crystal display panel) as described in JP-A-2011-70092, it is better that the relative dielectric constant of the glass substrate is higher in view of the improvement in the sensing sensitivity of the touch sensor, reduction in driving voltage, and power saving. If the relative dielectric constant is set to at least 5.6, it will improve the sensing sensitivity of the touch sensor. The relative dielectric constant is preferably at least 5.8, more preferably at least 6.0, further preferably at least 6.1, particularly preferably at least 6.2.

The relative dielectric constant can be measured by a method described in JIS C-2141.

The β-OH value of the alkali-free glass of the present invention can be appropriately selected depending on the required properties of the alkali-free glass. In order to increase the strain point of the alkali-free glass, and to increase the electrical resistivity during the electrical heating to obtain Joule heat easily, the β-OH value is preferably low. For example, in a case where the strain point is at least 710° C., the β-OH value is preferably at most 0.45 mm$^{-1}$, more preferably at most 0.4 mm$^{-1}$, still more preferably at most 0.35 mm$^{-1}$.

The β-OH value may be adjusted by various conditions at the time of the melting of the raw material, for example, the water content in the glass raw material, the water vapor concentration in the melting furnace, and the retention time of the molten glass in the melting furnace. As a method of adjusting the water content in the glass raw material, a method of using a hydroxide instead of an oxide as the glass raw material (for example, a method of using magnesium hydroxide (Mg(OH)$_2$) instead of magnesium oxide (MgO) as a magnesium source) may be mentioned. As a method of adjusting the water vapor concentration in the melting furnace, a method of mixing fossil fuel with oxygen gas for burning at the time of burning by a burner, or a method of mixing it with oxygen gas and air for burning, may be mentioned.

Examples

In the following, Ex. 1, 3, 7 to 18 are Examples, and Ex. 2, 4 to 6 are Comparative Examples.

The electrical resistivity in a temperature range of from 1,400 to 1,600° C. of a molten glass having the composition in each of Ex. 3 to 6 and a refractory (zirconia electrocast refractory) was measured.

A molten glass was prepared by mixing raw materials of the respective components so as to have each composition shown in Table, and melting them at a temperature of 1,600° C. by using a platinum crucible. In the melting, homogenization of the glass was conducted with stirring by a platinum stirrer. The electrical resistivity of the molten glass thus obtained was measured by a method described in the following document in the state of being held in a temperature range of from 1,400 to 1,600° C.

"Study on Measuring Method of the Electrical Conductivity of Ionic Solutions and Melts, Takao Ohta, Akira Miyanaga, Kenji Morinaga, and Tsutomu Yanagase, Journal of the Japan Institute of Metals and Materials, Vol. 45, No. 10 (1981) p. 1,036-1,043"

Regarding a zirconia electrocast refractory having the following chemical composition and mineral composition (Refractory 1 and Refractory 2), the electrical resistivity was measured by expanding the measurement principle of volume resistivity (Section 14) of "JIS C-2141, Testing Method of Electrical Insulating Ceramic Materials" to a high temperature (arranging the sample in an electric furnace and heating), in the state of being held in a temperature range of from 1,400 to 1,600° C.

[Refractory 1]
Chemical composition (mass %):
$ZrO_2$: 88, $SiO_2$: 9.3, $Al_2O_3$: 1.5, $P_2O_3$: 0.1, $B_2O_3$: 0.8, $Fe_2O_3$: 0.05, $TiO_2$: 0.15, $Na_2O$: 0.02, $K_2O$: 0.04
Mineral composition (mass %):
Baddeleyite: 88, Glass phase: 12

[Refractory 2]
Chemical composition (mass %):
$ZrO_2$: 94.5, $SiO_2$: 4.0, $Al_2O_3$: 0.8, $P_2O_5$: 0.10, $B_2O_3$: 0.8, $Fe_2O_3$: 0.05, $TiO_2$: 0.15, $Na_2O$: 0.4, $K_2O$: 0.01
Mineral composition (mass %):
Baddeleyite: 88, Glass phase: 12

Figure 1:
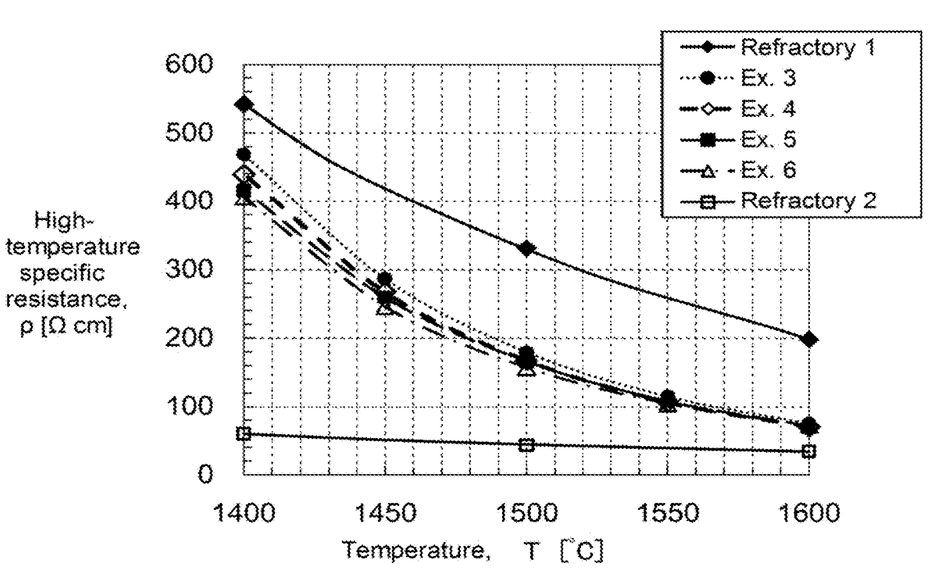
FIG. 1 is a graph showing the measurement results of the electric resistivity of molten glasses (compositions of Ex. 3 to 6) and refractories (Refractories 1 and 2) in Examples.

The measurement results of the electrical resistivity are shown in FIG. 1. As can be seen from FIG. 1, in the temperature range of from 1,400 to 1,600° C., Rb of Refractory 1 was higher than Rg of the glasses of the compositions of Ex. 3 to 6. If such Refractory 1 is used to constitute the melting furnace, it is considered that the current flow from the heating electrode to the refractory constituting the melting furnace is suppressed during the electrical heating.

On the other hand, in Refractory 2, the electric resistivity Rb at from 1,400 to 1,600° C. had the relation of Rb<Rg with respect to the electric resistivity Rg of the molten glass. When the melting furnace is constituted by such Refractory 2, it is considered that the current flows from the heating electrode to the refractory constituting the melting furnace during the electrical heating.

The raw materials of the respective components prepared so as to have the target composition were charged into the melting furnace composed of the above Refractory 1, and melted at a temperature of from 1,500 to 1,600° C. Regarding the particle size of silica sand in the raw materials used at this time, the median particle diameter $D_{50}$ was 26 μm, the proportion of particles having a particle size of at most 2 μm was less than 0.1%, the proportion of particles having a particle diameter of at least 100 μm was 0.6%, and the mass ratio (in terms of MO) of the hydroxide material in the alkaline earth metal was 23±5%. For heating of the melting furnace, the heating by combustion flame of the burner and the electrical heating of the molten glass by a heating electrode arranged so as to be immersed in the molten glass in the melting furnace were used in combination. During the electrical heating, an alternating current voltage was applied to the heating electrode at a local current density of 0.5 A/cm$^2$, a potential difference between the electrodes of 300 V, and a frequency of 50 Hz.

Here, in a case where the total amount of the heating by combustion flame of the burner and the heating by electrical heating of the molten glass in the melting furnace is represented by $T_0$ (J/h), the heating amount T (J/h) by electrical heating meets the relation of $T=0.30 \times T_0$.

Next, the molten glass was poured out, formed into a plate shape and then gradually cooled.

In Tables 1 to 4, shown are the glass composition (unit: mol %) and the β-OH value (unit: mm$^{-1}$) of the glass, the transmittance at a wavelength of 300 nm (unit: %), the average thermal expansion coefficient at from 50 to 350° C. (unit: ×10$^{-7}$/° C.), the strain point (unit: ° C.), the glass transition point (unit: ° C.), the density (g/cm$^3$), the Young's modulus (GPa) (measured by ultrasonic method), the high temperature viscosity value: the temperature $T_2$ (a temperature at which the glass viscosity η becomes 10$^2$ poise, unit: ° C.) which is an index of meltability and the temperature $T_4$ (a temperature at which the glass viscosity η becomes 10$^4$ poise, unit: ° C.) which is an index of float moldability and fusion moldability, the devitrification temperature (unit: ° C.), the photoelastic constant (unit: nm/MPa/cm) (measured at a measurement wavelength of 546 nm by a disk compression method using a sample formed into a plate shape and cooled gradually), and the compaction (unit: ppm).

In Tables 1 to 4, the values shown in parentheses are calculated values.

In addition, the β-OH value and the method of measuring the compaction are as described below.

[Method for Measuring β-OH Value]

For the glass sample, the transmittance is measured using an infrared spectrophotometer. The β-OH can be obtained by the following formula in which the minimum value of the transmittance (%) at a wave number of from 3,500 to 3,700 cm$^{-1}$ is $l_a$, the transmittance (%) at a wavenumber of 4,000 cm$^{-1}$ is $l_b$ and the thickness (mm) of the sample is d.

$$\beta\text{-OH (mm}^{-1}) = -(\log(l_a/l_b))/d$$

[Method for Measuring Compaction]

A glass plate sample (a specimen with 100 mm length×10 mm width×1 mm thickness, polished with cerium oxide) was held at a temperature of the glass transition point plus 100° C. for 10 minutes and then cooled to a room temperature at a rate of 40° C. per minute. Dotted indentations were applied to the surface of the sample at two positions in the length direction at the interval A (A=95 mm), heated to 600° C. at a rate of 100° C. per hour, held at 600° C. for 80 minutes, and cooled to a room temperature at a rate of 100° C. per hour, and then the interval B between the indentations was measured. Here, A and B were measured by an optical microscope. The compaction can be obtained from (A−B)/A.

TABLE 1

|  | Ex. 1 | Ex. 2 | Ex. 3 | Ex. 4 | Ex. 5 | Ex. 6 |
|---|---|---|---|---|---|---|
| $SiO_2$ | 67.0 | 67.0 | 67.0 | 67.0 | 66.9 | 66.9 |
| $Al_2O_3$ | 13.5 | 13.5 | 12.7 | 12.7 | 12.7 | 12.7 |
| $B_2O_3$ | 0 | 0 | 1.4 | 1.4 | 1.3 | 1.3 |
| MgO | 9.7 | 9.7 | 9.1 | 9.1 | 9.1 | 9.1 |
| CaO | 5.4 | 5.4 | 5.4 | 5.4 | 5.4 | 5.4 |
| SrO | 4.4 | 4.4 | 4.4 | 4.4 | 4.4 | 4.4 |
| BaO | 0 | 0 | 0 | 0 | 0 | 0 |
| $Fe_2O_3$ | 0.01 | 0.01 | 0.01 | 0.04 | 0.04 | 0.01 |
| $Na_2O$ | 0.01 | 0.10 | 0.01 | 0.01 | 0.10 | 0.01 |
| $K_2O$ | 0 | 0.01 | 0 | 0 | 0.01 | 0 |
| $SnO_2$ | 0 | 0 | 0 | 0 | 0 | 0.13 |
| β-OH [$mm^{-1}$] | 0.2 | 0.2 | 0.2 | 0.2 | 0.2 | 0.2 |
| MgO + CaO + SrO + BaO | 19.5 | 19.5 | 18.9 | 18.9 | 18.9 | 18.9 |
| MgO/(MgO + CaO + SrO + BaO) | 0.50 | 0.50 | 0.48 | 0.48 | 0.48 | 0.48 |
| MgO/(MgO + CaO) | 0.64 | 0.64 | 0.63 | 0.63 | 0.63 | 0.63 |
| MgO/(MgO + SrO) | 0.69 | 0.69 | 0.67 | 0.67 | 0.67 | 0.67 |
| Parameter of formula (I) | 0.10 | 0.65 | 0.10 | 0.25 | 0.80 | 0.70 |
| Ultraviolet transmittance at wavelength of 300 nm (in glass thickness of 0.5 mm) [%] | 77 | 77 | 77 | 48 | 48 | (77) |
| Strain point [° C.] | 730 | 730 | 720 | 720 | 720 | 720 |
| Glass transition point [° C.] | 786 | 786 | 778 | 778 | 778 | 778 |
| Average thermal expansion coefficient [×$10^{-7}$/° C.] | 39.0 | 39.0 | 39.0 | 39.0 | 39.0 | 39.0 |
| Density [g/cm3] | 2.59 | 2.59 | 2.582 | 2.582 | 2.582 | 2.582 |
| $T_2$ [° C.] | 1,655 | 1,655 | 1,654 | 1,654 | 1,654 | 1,654 |
| $T_4$ [° C.] | 1,298 | 1,298 | 1,304 | 1,304 | 1,304 | 1,304 |
| Devitrification temperature [° C.] | 1,285 | 1,285 | 1,285 | 1,285 | 1,285 | 1,285 |
| Young's modulus [GPa] | 87 | 87 | 86 | 86 | 86 | 86 |
| Specific elastic modulus [MNm/kg] | 33.6 | 33.6 | 33.3 | 33.3 | 33.3 | 33.3 |
| Photoelastic constant [nm/MPa/cm] | 26.6 | 26.6 | 26.8 | 26.8 | 26.8 | 26.8 |
| Relative dielectric constant | 6.2 | 6.2 | 6.1 | 6.1 | 6.1 | 6.1 |
| Electrical resistivity at 1,400° C. [Ω · cm] | 536 | 434 | 469 | 439 | 416 | 406 |
| Compaction [ppm] | 43 | 58 | 43 | 43 | 58 | 43 |

TABLE 2

|  | Ex. 7 | Ex. 8 | Ex. 9 | Ex. 10 | Ex. 11 | Ex. 12 |
|---|---|---|---|---|---|---|
| $SiO_2$ | 67.0 | 67.1 | 66.9 | 66.9 | 66.9 | 68.5 |
| $Al_2O_3$ | 13.1 | 13.0 | 13.2 | 13.1 | 13.0 | 13.0 |
| $B_2O_3$ | 0.4 | 0.7 | 0.9 | 1.1 | 1.3 | 1.3 |
| MgO | 9.9 | 9.7 | 9.3 | 9.2 | 9.0 | 11.0 |
| CaO | 5.3 | 7.2 | 5.3 | 5.3 | 5.3 | 4.2 |
| SrO | 4.3 | 2.3 | 4.4 | 4.4 | 4.5 | 2.0 |
| BaO | 0.0 | 0.0 | 0.0 | 0.0 | 0.0 | 0.0 |
| $Fe_2O_3$ | 0.01 | 0.01 | 0.01 | 0.01 | 0.01 | 0.01 |
| $Na_2O$ | 0.01 | 0.01 | 0.01 | 0.01 | 0.01 | 0.01 |
| $K_2O$ | 0 | 0 | 0 | 0 | 0 | 0 |
| $SnO_2$ | 0 | 0 | 0 | 0 | 0 | 0 |
| β-OH [$mm^{-1}$] | 0.2 | 0.2 | 0.2 | 0.2 | 0.2 | (0.2) |
| MgO + CaO + SrO + BaO | 19.5 | 19.2 | 19.0 | 18.9 | 18.8 | 17.2 |
| MgO/(MgO + CaO + SrO + BaO) | 0.51 | 0.51 | 0.49 | 0.49 | 0.48 | 0.64 |
| MgO/(MgO + CaO) | 0.65 | 0.57 | 0.64 | 0.63 | 0.63 | 0.72 |
| MgO/(MgO + SrO) | 0.70 | 0.81 | 0.68 | 0.68 | 0.67 | 0.85 |
| Parameter of formula (I) | 0.10 | 0.10 | 0.10 | 0.10 | 0.10 | 0.10 |
| Ultraviolet transmittance at wavelength of 300 nm (in glass thickness of 0.5 mm) [%] | 77 | 77 | 77 | 77 | 77 | (77) |
| Strain point [° C.] | 724 | 720 | 719 | 718 | 714 | (721) |
| Glass transition point [° C.] | 786 | 784 | 783 | 784 | 779 | (786) |
| Average thermal expansion coefficient [×$10^{-7}$/° C.] | 40.6 | 38.9 | 40.2 | 39.5 | 40.4 | (36.2) |
| Density [g/cm3] | 2.591 | 2.553 | 2.594 | 2.592 | 2.588 | (2.52) |
| $T_2$ [° C.] | 1,649 | 1,646 | 1,645 | 1,644 | 1,644 | (1,666) |
| $T_4$ [° C.] | 1,304 | 1,300 | 1,300 | 1,298 | 1,298 | (1,310) |
| Devitrification temperature [° C.] | 1,255 | 1,253 | 1,261 | 1,270 | 1,275 |  |
| Young's modulus [GPa] | 89 | 88 | 88 | 88 | 88 | (85) |
| Specific elastic modulus [MNm/kg] | 34.2 | 34.6 | 34.1 | 34.0 | 33.9 | (34) |
| Photoelastic constant [nm/MPa/cm] | 26 | 27 | 26 | 26 | 27 | (28) |
| Relative dielectric constant | 6.1 | 6.2 | 6.2 | 6.2 | 6.1 | (6.1) |
| Electrical resistivity at 1,400° C. [Ω · cm] | (400-500) | (400-500) | (400-500) | (400-500) | (400-500) | (400-500) |
| Compaction [ppm] | (≤80) | (≤80) | (≤80) | (≤80) | (≤80) | (≤80) |

TABLE 3

|  | Ex. 13 | Ex. 14 | Ex. 15 | Ex. 16 | Ex. 17 | Ex. 18 |
|---|---|---|---|---|---|---|
| $SiO_2$ | 66.0 | 66.9 | 68.7 | 66.8 | 68.6 | 66.2 |
| $Al_2O_3$ | 13.8 | 13.0 | 12.0 | 12.6 | 12.7 | 12.9 |
| $B_2O_3$ | 2.8 | 1.7 | 0.6 | 2.5 | 0.3 | 1.3 |
| MgO | 8.7 | 8.8 | 11.4 | 8.4 | 11.4 | 8.9 |
| CaO | 6.1 | 5.1 | 4.2 | 5.2 | 4.1 | 5.2 |
| SrO | 2.6 | 4.5 | 3.1 | 4.5 | 2.7 | 4.5 |
| BaO | 0 | 0 | 0 | 0 | 0.3 | 0 |
| $Fe_2O_3$ | 0.01 | 0.01 | 0.01 | 0.01 | 0.01 | 0.01 |
| $Na_2O$ | 0.01 | 0.01 | 0.01 | 0.01 | 0.01 | 0.01 |
| $K_2O$ | 0 | 0 | 0 | 0 | 0 | 0 |
| $SnO_2$ | 0 | 0 | 0 | 0 | 0 | 0 |
| β-OH [$mm^{-1}$] | (0.2) | (0.2) | (0.2) | (0.2) | (0.2) | (0.2) |
| MgO + CaO + SrO + BaO | 17.4 | 18.4 | 18.7 | 18.1 | 18.5 | 18.6 |
| MgO/(MgO + CaO + SrO + BaO) | 0.50 | 0.48 | 0.61 | 0.46 | 0.62 | 0.48 |
| MgO/(MgO + CaO) | 0.59 | 0.63 | 0.73 | 0.62 | 0.74 | 0.63 |
| MgO/(MgO + SrO) | 0.77 | 0.66 | 0.79 | 0.65 | 0.81 | 0.67 |
| Parameter of formula (I) | 0.10 | 0.10 | 0.10 | 0.10 | 0.10 | 0.10 |
| Ultraviolet transmittance at wavelength of 300 nm (in glass thickness of 0.5 mm) [%] | (77) | (77) | (77) | (77) | (77) | (77) |
| Strain point [° C.] | 715 | (715) | (733) | (714) | (737) | (725) |
| Glass transition point [° C.] | 767 | 768 | (786) | (769) | (791) | (781) |
| Average thermal expansion coefficient [×$10^{-7}$/° C.] | 37.5 | 40.8 | (36.9) | (39.1) | (36.6) | (39.4) |
| Density [g/cm3] | 2.54 | 2.591 | (2.55) | (2.57) | (2.56) | (2.58) |
| $T_2$ [° C.] | 1,631 | 1,643 | (1,668) | (1,652) | (1,671) | (1,652) |
| $T_4$ [° C.] | 1,285 | 1,295 | (1,312) | (1,296) | (1,316) | (1,301) |
| Devitrification temperature [° C.] | 1,245 | 1,250 |  |  |  |  |
| Young's modulus [GPa] | 86 | 84 | (88) | (85) | (89) | (87) |
| Specific elastic modulus [MNm/kg] | 33.9 | 32.6 | (35) | (33) | (35) | (34) |
| Photoelastic constant [nm/MPa/cm] | 27.7 | 27.0 | (26) | (28) | (26) | (27) |
| Relative dielectric constant | (6.1) | (6.1) | (6.0) | (6.0) | (6.0) | (6.0) |
| Electrical resistivity at 1,400° C. [Ω · cm] | (400-500) | (400-500) | (400-500) | (400-500) | (400-500) | (400-500) |
| Compaction [ppm] | (≤80) | (≤80) | (≤80) | (≤80) | (≤80) | (≤80) |

TABLE 4

|  | Ex. 19 | Ex. 20 | Ex. 21 | Ex. 22 | Ex. 23 | Ex. 24 |
|---|---|---|---|---|---|---|
| $SiO_2$ | 72.0 | 68.7 | 67.7 | 68.4 | 69.2 | 68.1 |
| $Al_2O_3$ | 10.0 | 13.5 | 14.0 | 13.2 | 12.7 | 13.5 |
| $B_2O_3$ | 1.0 | 2.3 | 2.5 | 2.4 | 2.4 | 2.3 |
| MgO | 11.0 | 3.5 | 3.0 | 10.0 | 9.5 | 6.1 |
| CaO | 3.8 | 7.5 | 7.5 | 1.5 | 5.7 | 4.0 |
| SrO | 2.2 | 4.5 | 4.5 | 4.5 | 0.5 | 1.5 |
| BaO | 0 | 0 | 0.9 | 0 | 0.0 | 4.5 |
| $Fe_2O_3$ | 0.01 | 0.01 | 0.01 | 0.01 | 0.01 | 0.01 |
| $Na_2O$ | 0.01 | 0.01 | 0.01 | 0.01 | 0.01 | 0.01 |
| $K_2O$ | 0 | 0 | 0 | 0 | 0 | 0 |
| $SnO_2$ | 0 | 0 | 0 | 0 | 0 | 0 |
| β-OH [$mm^{-1}$] | (0.2) | (0.2) | (0.2) | (0.2) | (0.2) | (0.2) |
| MgO + CaO + SrO + BaO | 17.0 | 15.5 | 15.9 | 16.0 | 15.7 | 16.1 |
| MgO/(MgO + CaO + SrO + BaO) | 0.65 | 0.23 | 0.19 | 0.63 | 0.61 | 0.38 |
| MgO/(MgO + CaO) | 0.74 | 0.32 | 0.29 | 0.87 | 0.63 | 0.60 |
| MgO/(MgO + SrO) | 0.83 | 0.44 | 0.40 | 0.69 | 0.95 | 0.80 |
| Parameter of formula (I) | 0.08 | 0.08 | 0.10 | 0.10 | 0.10 | 0.10 |
| Ultraviolet transmittance at wavelength of 300 nm (in glass thickness of 0.5 mm) [%] | (77) | (77) | (77) | (77) | (77) | (77) |
| Strain point [° C.] | (34.6) | (38.6) | (40.0) | (34.7) | (33.2) | (39.0) |
| Glass transition point [° C.] | (730) | (726) | (725) | (720) | (723) | (726) |
| Average thermal expansion coefficient [×$10^{-7}$/° C.] | (776) | (780) | (780) | (777) | (777) | (779) |
| Density [g/cm3] | (2.50) | (2.55) | (2.58) | (2.54) | (2.47) | (2.64) |
| $T_2$ [° C.] | (86) | (83) | (83) | (85) | (86) | (82) |
| $T_4$ [° C.] | (34) | (33) | (32) | (34) | (35) | (31) |
| Devitrification temperature [° C.] | (1,700) | (1,700) | (1,690) | (1,680) | (1,700) | (1,690) |
| Young's modulus [GPa] | (1,323) | (1,329) | (1,324) | (1,318) | (1,327) | (1,324) |
| Specific elastic modulus [MNm/kg] |  |  |  |  |  |  |
| Photoelastic constant [nm/MPa/cm] | (29) | (28) | (28) | (29) | (29) | (27) |

TABLE 4-continued

| | Ex. 19 | Ex. 20 | Ex. 21 | Ex. 22 | Ex. 23 | Ex. 24 |
|---|---|---|---|---|---|---|
| Relative dielectric constant | (5.8) | (5.8) | (6.0) | (5.9) | (5.8) | (6.3) |
| Electrical resistivity at 1,400° C. [Ω · cm] | (400-500) | (400-500) | (400-500) | (400-500) | (400-500) | (400-500) |
| Compaction [ppm] | (≤60) | (≤60) | (≤60) | (≤60) | (≤60) | (≤60) |

As can be seen from Tables 1 to 4, in all cases, the thermal expansion coefficient is as low as from $30\times10^{-7}$ to $40\times10^{-7}$/° C., the strain point is as high as at least 690° C., and the compaction is small. Thus, it can be understood that they can withstand the heat treatment at high temperatures. Moreover, since the value (parameter) represented by the formula (I) is small in the glasses of Examples, the electrical resistivity at 1,400° C. is higher than that of Comparative Examples and it is possible to obtain Joule heat by energization more efficiently.

The temperature $T_2$ serving as an index of meltability is as relatively low as at most 1,710° C., and the melting is easy. The temperature $T_4$ serving as an index of formability is at most 1,350° C., and the molding by a float method is particularly easy. Further, the devitrification temperature is at most 1,350° C., and it is considered that there is no trouble such as generation of devitrification especially at the time of float molding.

The photoelastic constant is at most 31 nm/MPa/cm, and if it is used as the glass substrate of a liquid crystal display, it will suppress the reduction in contrast.

In addition, the relative dielectric constant is at least 5.6, and if it is used as the glass substrate of an in-cell touch panel, the sensing sensitivity of the touch sensor will improve.

Although the present invention has been described in detail and with reference to specific embodiments, it will be apparent to those skilled in the art that various modifications and variations can be made without departing from the spirit and scope of the invention.

INDUSTRIAL APPLICABILITY

The alkali-free glass of the present invention has a high strain point and a good foam quality, and is suitable for applications such as display substrates, photomask substrates, flexible OLED production substrates, etc. It is also suitable for applications such as solar cell substrates, glass substrates for magnetic disks, etc.

This application is a continuation of PCT Application No. PCT/JP2017/029817, filed on Aug. 21, 2017, which is based upon and claims the benefit of priority from Japanese Patent Application No. 2016-162676 filed on Aug. 23, 2016. The contents of those applications are incorporated herein by reference in their entireties.

What is claimed is:

1. An alkali-free glass, comprising, as represented by mol % based on oxides,

| | |
|---|---|
| $SiO_2$ | from 65 to 75, |
| $Al_2O_3$ | from 9 to 15, |
| $B_2O_3$ | from 0 to 3, |
| MgO | from 5 to 12, |
| CaO | from 3 to 8, |
| SrO | from 1 to 6, |
| BaO | from 0 to 5, |
| $Fe_2O_3$ | from 0.001 to 0.03, |
| $Na_2O$ | from 0.003 to 0.06, |
| $K_2O$ | from 0 to 0.02, |
| $SnO_2$ | from 0 to 0.12, and |
| $ZrO_2$ | from 0 to 2, | wherein MgO+CaO+SrO+BaO is from 12 to 22, MgO/(MgO+CaO+SrO+BaO) is at least 0.33, MgO/(MgO+CaO) is at least 0.40, MgO/(MgO+SrO) is at least 0.45, and $4.84[Fe_2O_3]+5.65[Na_2O]+4.03[K_2O]+4.55[SnO_2]$ is at most 0.55, and wherein an average thermal expansion coefficient at from 50 to 350° C. is from $30\times10^{-7}$ to $45\times10^{-7}$/° C.

2. The alkali-free glass according to claim 1, wherein the alkali-free glass has a strain point of at least 690° C., a temperature $T_2$ at which a glass viscosity becomes $10^2$ dPa·s of at most 1,710° C., and a temperature $T_4$ at which the glass viscosity becomes $10^4$ dPa·s of at most 1.350° C.

3. The alkali-free glass according to claim 1, wherein a strain point of the alkali-free glass is at least 725° C.

4. The alkali-free glass according to claim 1, wherein a glass transition point of the alkali-free glass is at least 750° C.

5. The alkali-free glass according to claim 1, wherein a compaction is at most 50 ppm.

6. The alkali-free glass according to claim 1, wherein a compaction is at most 80 ppm.

7. The alkali-free glass according to claim 1, wherein an ultraviolet transmittance of the alkali-free glass at the wavelength of 300 nm in the plate thickness of 0.5 mm is at least 40%.

8. The alkali-free glass according to claim 1, of wherein a photoelastic constant of the alkali-free glass is at most 31 nm/MPa/cm.

9. The alkali-free glass according to claim 1, wherein a β-OH value of the alkali-free glass is at most 0.45 $mm^{-1}$.

10. The alkali-free glass according to claim 1, wherein a dielectric constant of the alkali-free glass is at least 5.6.

11. The alkali-free glass according to claim 1, wherein a Young's modulus of the alkali-free glass is at least 82 GPa.

12. The alkali-free glass according to claim 1, which is a substrate glass for displays.

13. A substrate glass for displays, comprising:
the alkali-free glass of claim 1, and
a thin film of a metal or oxide on at least one surface.

14. The alkali free substrate glass according to claim 13, wherein the substrate glass is used for a liquid crystal display device, an organic EL device, or a lighting device.

* * * * *